United States Patent [19]

Ueda et al.

[11] 4,044,345

[45] * Aug. 23, 1977

[54] METHOD FOR ADDRESSING X-Y MATRIX DISPLAY CELLS

[75] Inventors: Fumio Ueda; Hirotsugu Arai, both of Amagasaki, Japan

[73] Assignee: Mitsubishi Denki Kabushiki Kaisha, Tokyo, Japan

[ * ] Notice: The portion of the term of this patent subsequent to Nov. 25, 1992, has been disclaimed.

[21] Appl. No.: 624,427

[22] Filed: Oct. 21, 1975

Related U.S. Application Data

[63] Continuation-in-part of Ser. No. 453,065, March 20, 1974.

[51] Int. Cl.[2] .................................. G06F 3/14

[52] U.S. Cl. .................. 340/324 M; 340/166 EL; 340/336

[58] Field of Search ............ 340/324 R, 324 M, 336, 340/166 EL, 343; 350/160 LC

[56] References Cited

U.S. PATENT DOCUMENTS

| | | | |
|---|---|---|---|
| 2,817,815 | 12/1957 | Evans | 340/324 R |
| 3,654,606 | 4/1972 | Marlowe etal. | 340/324 M |
| 3,673,572 | 6/1972 | Sliva et al. | 340/166 EL |
| 3,703,331 | 11/1972 | Goldmacher et al. | 340/324 M |
| 3,744,878 | 7/1973 | Kiemle | 340/324 M |
| 3,750,136 | 7/1973 | Roess | 340/324 R |
| 3,824,003 | 7/1974 | Koda | 340/324 R |
| 3,922,667 | 11/1975 | Ueda et al. | 340/324 M |

*Primary Examiner*—Marshall M. Curtis
*Attorney, Agent, or Firm*—Oblon, Fisher, Spivak, McClelland & Maier

[57] ABSTRACT

A matrix addressing method for a group of X-Y matrix display cells having an $X_i$- $Y_j$ two-dimensional matrix electrode structure (where $i$ equals 1,2,3, . . . , M, and $j$ equals 1,2,3, . . . , N) during an N time frame period comprising the steps of: applying an $X_i$- electrode voltage $e_{Xi}$ having a binary value of one or zero to the 1,2,3, . . . , M electrodes in such a manner that only a single binary one is applied during an N time frame period, applying a $Y_j$-electrode voltage $e_{Yj}$ having a binary value of one or zero sequentially to the 1,2,3, . . . N $Y_j$ electrodes in such a manner that a binary one is only applied to the first electrode during the first time frame, a binary one is only applied to the second electrode during the second time frame, a binary one is only applied to the third electrode during the third time frame, . . . , and a binary one is only applied to the Nth electrode during the Nth time frame; and addressing matrix display cells $P_{ij}$ in response to the timing at which the electrode voltages $e_{Xi}$ and $e_{Yj}$ assume individual binary states.

8 Claims, 9 Drawing Figures

METHOD FOR ADDRESSING X-Y MATRIX DISPLAY CELLS

CROSS REFERENCE TO RELATED APPLICATION

This application is a continuation-in-part application of Ser. No. 453,065 filed Mar. 20, 1974 entitled MATRIX ADDRESSING SCHEME.

BACKGROUND OF THE INVENTION

1. Field of the Invention

The present invention relates to an addressing method for X-Y matrix devices comprising liquid crystal cells, intrinsic electroluminescent cells, or the like.

2. Description of the Prior Art

A prior art method for addressing X-Y matrix cells will be described in connection with a two-tone display device comprising liquid crystal cells, the apparent birefringence of which is controlled by an externally applied voltage. According to the prior art method, the frequency $f$ (1/T Hz) of the voltage applied is determined to be higher than the reciprocal of the response of the liquid crystal molecule so that the apparent birefringence of the liquid crystal cell depends on the effective value of the voltage applied.

This two-tone matrix device comprises N numbers of Y electrodes, $Y_1$ to $Y_N$, in one dimension of the matrix, and M numbers of X electrodes, $X_1$ to $X_M$, in the other dimension. Scanning voltages $e_{Y1}, e_{Y2}, \ldots, e_{YN}$ are applied to the Y electrodes $Y_1, Y_2, \ldots, Y_N$ respectively at a cycle T, while, signal voltages $e_{x1}, e_{x2}, \ldots, e_{XM}$ are applied to the X electrodes $X_1, X_2, \ldots, X_M$ respectively at the same cycle T. The scanning voltage $e_{Yj}$ and the signal voltage $e_{Xi}$ will assume waveforms as shown in FIG. 1 (a) if these voltages are given as a pulse train comprising N numbers of time slots over the period of a cycle T. In each time slot which corresponds to the period T/N, the scanning voltages $e_{Y1}, e_{Y2}, \ldots$ sequentially assume a "1" state, i.e., $a - V_1$ level in FIG. 1(a), and $e_{Yk}$ (where $K \neq j$; $k = 1,2, \ldots, N$) assumes a "0" state, i.e., a $V_2$ level in FIG. 1 (a) whenever $e_{Yj}$ is in the "1" state. In this manner the Y electrodes are scanned. While, in the $j$-th time slot, the signal pulse voltage $e_{Xi}$ applied to the electrode $X_i$ which corresponds to the $i$-th cell assumes a "1" state, i.e., a $V_4$ level in FIG. 1 (a), whereby the point selected among M number of cells $P_{ij}$ (where $i = 1,2, \ldots, M$) which corresponds to the $Y_j$ electrode on the X-Y matrix is determined. The signal voltage $e_{Xi}$ in the $j$-th time slot which corresponds to the unselected cells $P_{ij}$ assumes a "0" state, i.e., a $V_3$ level in FIG. 1 (a). Thus the voltage $e_{Xi} - e_{Yj}$ is applied to the X-Y matrix cell $P_{ij}$, and the pulse pattern in each time slot of the signal voltage $e_{Xi}$ determines a matrix cell to be selected, and the selected cell is scanned by the scanning voltage $e_{Yj}$ whereby the pattern designated by the signal pattern is displayed. FIG. 2 shows a pattern displayed on the matrix in response to the signal voltages $e_{X1}, e_{X2}, \ldots, e_{X5}$ shown in FIG. 1 (a).

In the prior art method, as described, an arbitrary number (0 to N) of "1" pulses are generated in N numbers of the time slots of the signal voltage $e_{Xi}$ (where $i = 1,2, \ldots, M$) whereby the desired cells on the X-Y matrix are selected for display. Under this mode of signal voltage, however, the voltage $e_{Xi} - e_{Hj}$ which is applied to the cell $P_{ij}$ necessarily assumes various waveform modes.

FIG. 1 (b) shows waveforms of the voltage $e_{Xi} - e_{Yj}$ in relation to FIG. 1(a). Generally, the X-Y matrix cell is not an ideal element in view of the rise characteristics (or threshold voltage) and it is limited in response to the voltage applied, since such response depends on the frequency of the voltage applied. For these reasons the cell $P_{ij}$ offers unnecessary responses when the voltage $e_{Xi} - e_{Yj}$ is applied in various waveforms. Furthermore, it is likely that a voltage such as $e_{X3} - e_{Y2}$ or $e_{X2} - e_{X6}$ in FIG. 1(b) is applied to an unselected point Pu to cause an unselected cell to become responsive. This necessarily determines the upper limit of the response contrast U. Generally, when the value of N is large, the upper limit of the contrast is low. Thus, in the prior art method for an X-Y matrix device comprising liquid crystal cells driven in response to the effective value of the voltage applied, the intensity of the light transmitted through the device is variable. (In some cases this problem may be solved by the use of a matrix addressing method capable of maintaining uniform the influence of cross-talk upon the picture quality.) Furthermore, according to the prior art, the ratio between light intensities at a selected point and at an unselected point, that is, the contrast, cannot be made high enough, which makes it impossible to realize satisfactory response of matrix cells.

SUMMARY OF THE INVENTION

Therefore, a principal object of the present invention is to provide a new and improved unique X-Y matrix addressing method in which the liberty of the pattern to be responsive is restrained whereby the prior art drawbacks are removed.

It is a further object of the present invention to provide a new an improved unique X-Y matrix addressing method which is simple in construction, inexpensive to embody, and capable of operation with little variation in the light intensity of the matrix cells and which offers a display having an excellent contrast.

With this and other objects in mind, the invention may best be incorporated into a two-tone matrix device comprising liquid crystal cells, the apparent birefringence of which is controllable by the effective value of an external voltage applied. This type of matrix device is characterized in that the scanning voltages $e_{Y1}, e_{Y2}, \ldots, e_{YN}$ applied to the scanning electrodes $Y_1, Y_2, \ldots, Y_N$ assume a "1" state only during one time slot over the period of a cycle T, and when one of the scanning voltages is in a "1" state, all the other scanning voltages assume a "0" state, as in the prior art device. The signal voltages $e_{X1}, e_{X2}, \ldots, e_{Xm}$ applied to the signal electrodes $X_1, X_2, \ldots, X_M$ assume a "1" state the same number of times for N number of the slots of the respective signal voltages, and the effective values of the voltage $e_{Xi} - e_{Yj}$ to be applied to the matrix cell $P_{ij}$ are made equal to each other for both the selected and unselected points.

BRIEF DESCRIPTION OF THE DRAWINGS

A more complete appreciation of the invention and many of the attendant advantages thereof, will be readily apparent as the same becomes better understood by reference to the following detailed description when considered in connection with the accompanying drawings, wherein.

DESCRIPTION OF THE PREFERRED EMBODIMENTS

To illustrate the invention in a specific application, a two-tone matrix device comprising liquid crystal cells dependent on the effective value of an external voltage applied will be described hereinafter.

Figure 3:
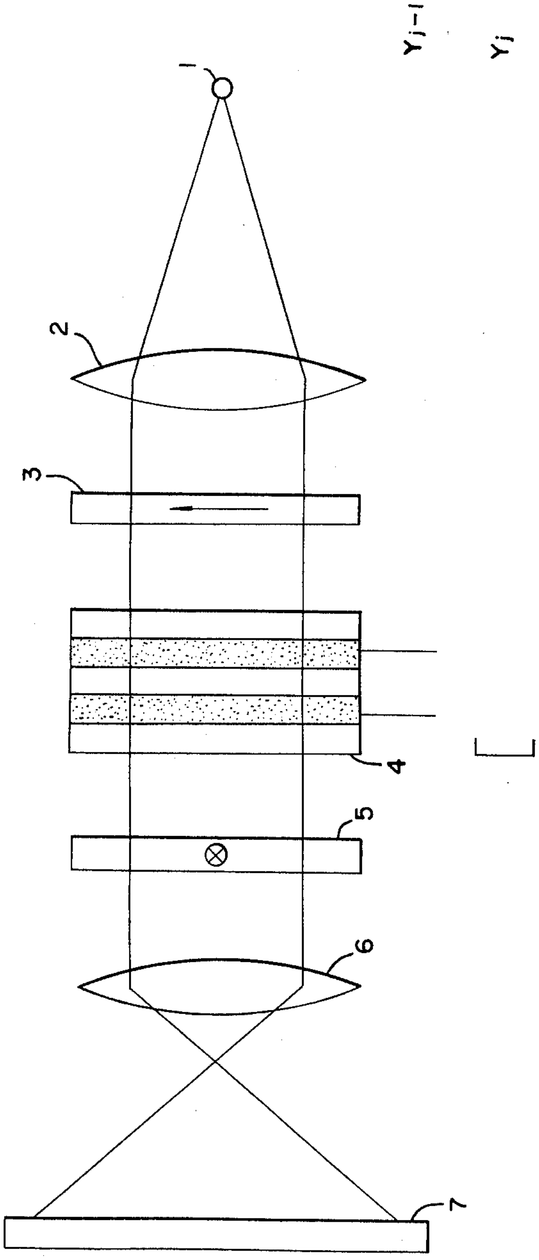
FIG. 3 is a diagram showing the construction of a device realized according to the present invention.

FIG. 3 shows the fundamental construction of a projection type two-tone matrix device constituted of liquid crystal cells. Referring now to FIG. 3, it is seen that light beams from a light source 1 are made parallel with each other through a lens 2, are polarized by a polarizer 3, and are then projected on a device 4 which comprises liquid crystal cells arranged in a matrix form. The light beam refracted by the liquid crystal cell 4 which is addressed by a matrix addressing circuit 8 is passed through an analyzer 5 and projected on a screen 7 through a lens 6.

The matrix device, is operated in the following manner. Scanning voltages $e_{Y1}, e_2, \ldots, e_{YN}$ are applied to N number of scanning electrodes $Y_1, Y_2, \ldots, Y_N$ at a cycle T. In the time slot $t_j$ which is 1/N of the cycle T, only the scanning voltage $e_{Yj}$ (where $j = 1,2, \ldots, N$) assumes a "1" state only in one of the N number of time slots, each being 1/N of the cycle T.

Figure 4:
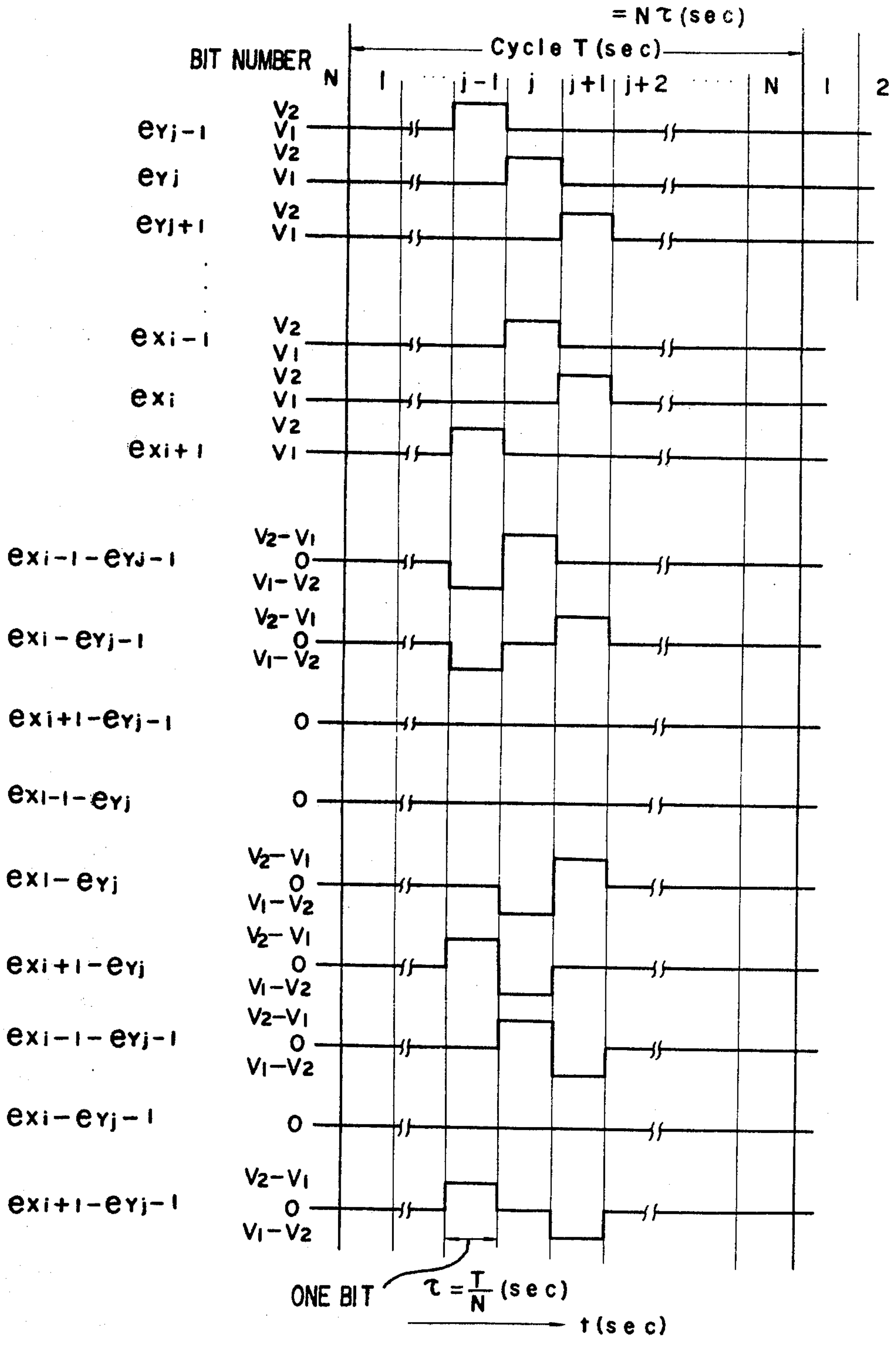
FIG. 4 is a time chart useful for illustrating the principles of the present invention.

FIG. 4 shows waveforms assumed by the scanning voltage, the signal voltage, and the voltage applied to the matrix cell $P_{ij}$. In FIG. 4, the potential $V_2$ strands for the "1" state, and the potential $V_1$ for the "0" state. These states are assumed by the scanning voltage and the signal voltage. The effective value $E_{ij}$ of the voltage $e_{Xi} - e_{Yj}$ which is applied to the matrix cell $P_{ij}$ is $$E_{ij} = \sqrt{\frac{1}{T}\int_{O}^{T} (e_{Xi} - e_{Yj})^2 dt}$$

Figure 1A:
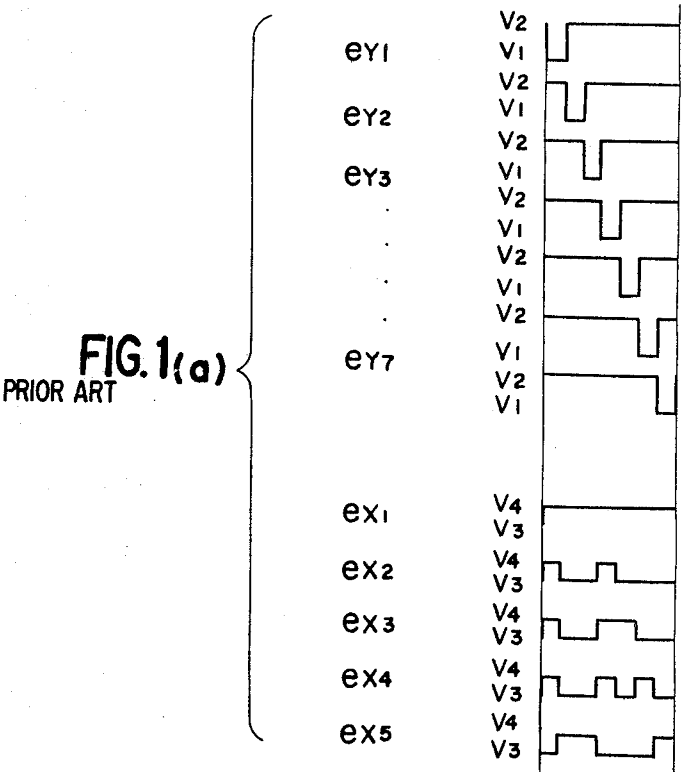
FIG. 1(a) PRIOR ART
FIGS. 1(a), 1(b) and 2 are diagrams illustrating features of a prior art scheme.
Figure 1B:
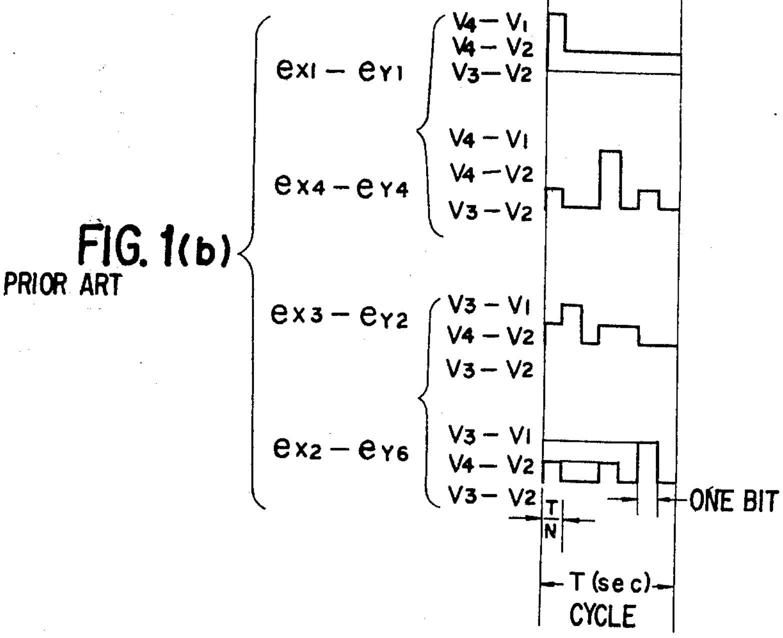
FIG. 1(b) PRIOR ART
Figure 2:
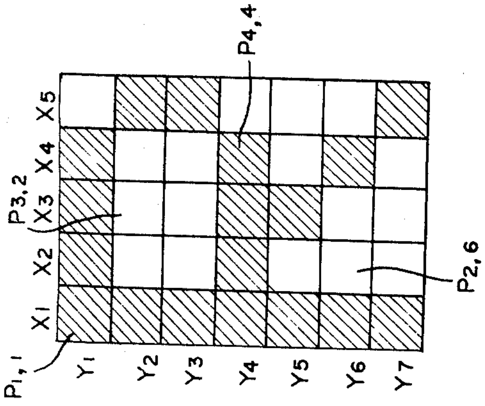
FIG. 2 PRIOR ART
Figure 5:
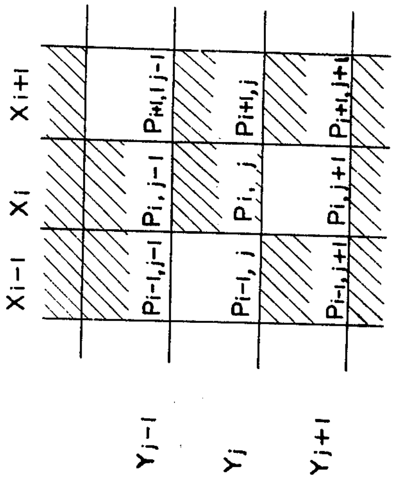
FIGS. 5, 6(a) and 6(b) are graphic illustrations of patterns pertaining to the operation according to the present invention.

In the instance of FIG. 4, $E_{i+1,j-1}, E_{i-1,j}, E_{i,j+1} = 0$, and in other instances, $\sqrt{2/N} \cdot | V_2 - V_1 |$. When a matrix cell where the effective voltage is zero is considered as a selected point, a pattern corresponding to the signal waveform shown in FIG. 4 may be displayed as shown in FIG. 5. In FIG. 5, the blank portions represent the selected points; and the hatched portions, the unselected points. This pattern can be displayed on the device shown in FIG. 3.

In the X-Y matrix addressing method of the effective value dependent type in which the signal voltage assumes a "1" state only in one time slot, and the signal voltage and the scanning voltage are given in the same value for both "1" and "0" states, the effective voltage $E_{ij}$ applied to the cell at an unselected point, to which the voltage $e_{Xi} - e_{Yj}$ is applied, assumes a constant value proportional to the difference between the voltages representing the "1" and "0" states of the signal voltage and the scanning voltage when the "1" state of the signal voltage $e_{Xi}$ and the "1" state of the scanning voltage $e_{Yj}$ are not present in the same time slot. While, when the "1" states of the two voltages are present in the same time slot, the effective voltage $E_{ij}$ applied to the cell at a selected point, to which the voltage $e_{Xi} - e_{Yj}$ is applied, assumes zero at all times. Thus the ratio between responses at a selected point and at an unselected point is infinite and a nearly perfect contrast U can be obtained, unlike the prior art method where the liberty of display is large. Furthermore, according to the present invention, the effective voltage can be applied uniformly to the effective value dependent type cells at selected and unselected points, with the result that variations in the response by the individual matrix cells are prevented.

Figure 6:
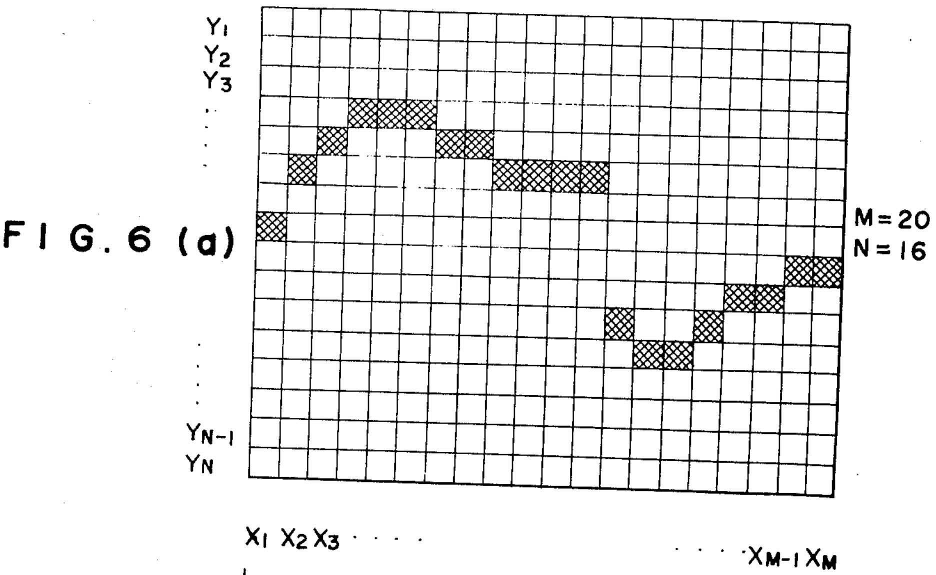
Figure 6:
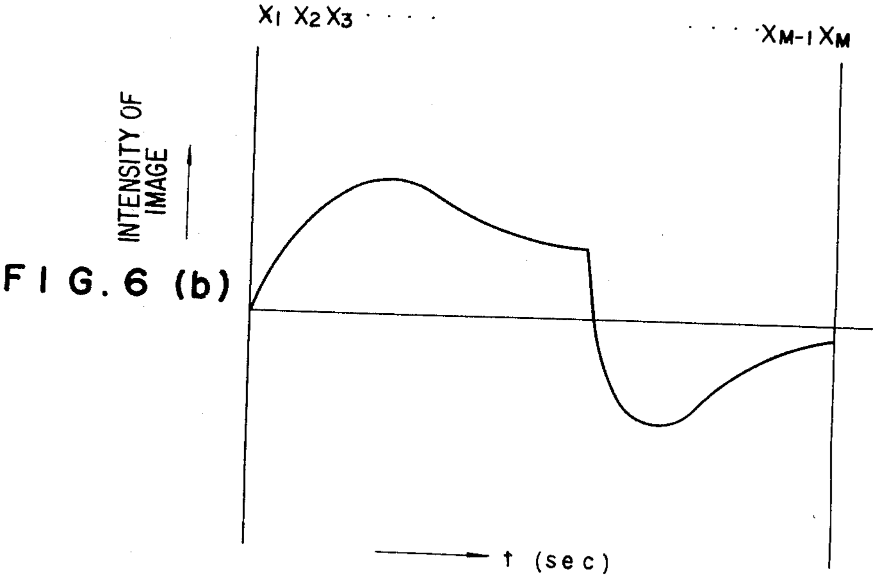

FIG. 6(a) shows a matrix pattern obtained according to a transient phenomenal curve of FIG. 6(b) by the use of the foregoing matrix device of this invention. This matrix comprises 16 (N) numbers of scanning electrodes, and 20 (M) numbers of signal electrodes.

In the matrix addressing method of this invention, if the matrix cells are not effective value dependent type or if the matrix cells, though of the effective value dependent type, are controlled by a voltage whose frequency is outside the range where the effective value control is available, the voltage applied to the selected point is constantly zero, but the voltage applied to the unselected point assumes, in general, different waveforms according to the points which are not selected, as indicated by waveforms at the six unselected points in FIG. 4. This implies the possibility of causing different responses according to unselected points. However, when the voltage versus transmission light intensity (the degree of apparent response) characteristic taken on the frequency of the voltage as a parameter is made saturable by reasonably increasing the absolute value of the voltage applied to the unselected point, such as by utilizing the phenomenon called the dynamic scattering mode (DSM) of nematic liquid crystal cell, then even if the frequency spectrum of the voltage applied to the unselected point is varying from one point to another, the response to the input waveform which is variable at unselected points can be made uniform by choosing the application voltage to be large. Thus, by the use of the foregoing X-Y matrix addressing method of the present invention in which a limitation is set on the selection of a pattern voltage, a more excellent contrast U and higher quality patterns involving much less variation can be obtained than in the prior art method where a large display liberty is allowed.

When the intrinsic electroluminescent cell (briefly, EL cell) is used for the X-Y matrix cell, the light emission intensity of the EL cell, including the light intensity sensed by human eyes, is proportional to the frequency of the voltage applied because the luminescence of the EL cell relates to the differentiated value of the waveform of the voltage applied and the light intensity sensed by human eyes relates to the integrated value of the luminescence. Therefore, when the "1" pulses of the voltages $e_{Xi}$ and $e_{Yj}$ applied to the X-Y matrix are of a burst voltage, the frequency spectrum of the voltages applied to unselected points moves toward the high frequency side and thus it becomes possible to ignore the variation in the light intensity of the luminescent cells, unlike the mode where the voltages $e_{Xi}$ and $e_{Yj}$ are not taken as a burst voltage, resulting in a considerable variation in the light intensity caused by the difference in te frequency spectrum of the voltage applied to unselected points.

Instead of this burst voltage mode, other voltage modes may be adopted; for example, the voltage waveforms representing the "1" and "0" states in the time slots of the signal voltage $e_{Xi}$ and the scanning voltage $e_{Yj}$ may be sinusoidal or triangular to be inverse with respect to the "1" and "0" states. The voltage mode where the "1" state is respresented by a potential $V_2$, and the "0" state by a potential $V_1$ is considered practical in view of the fact that the adoption of this mode permits easier access to the latest solid state electronic techniques, which in turn makes it possible to integrate matrix cells and circuits for generating signal voltages and scanning voltages and thereby to reduce the production cost.

In the foregoing method of the present invention, the voltage waveforms representing the "1" states and their levels are the same in view of the state assumed for either the signal voltage $e_{Xi}$ and the scanning voltage $e_{Yj}$, and the "1" state allowed for the signal voltage $e_{Xi}$ is only for one time slot. The invention is not limited to this example and the pulses representing the "1" state (or "0" state) of the signal voltage $e_{Xi}$ and the scanning voltage $e_{Yj}$ may be at the same polarity or at the reverse polarity. If it is desired that no DC component be present in the voltage $e_{Xi} - e_{Yj}$ in order to improve the contrast of a display on the matrix and to extend the life of the matrix cells, the voltages $e_{Xi}$ and $e_{Yj}$ may be set suitable potential levels. In any case, the effective voltages to be applied to the selected point and the unselected point are made uniform.

More specifically, assume that the potentials corresponding to the state "1" and "0" of the scanning voltage $e_{Yj}$ are $V_2$ and $V_1$ respectively, and the potentials corresponding to the states "1" and "0" of the signal voltage $e_{Xi}$ are $V_4$ and $V_3$ respectively. Then the DC component contained in the voltage $e_{Xi} - e_{Yj}$ is given as follows since the voltage applied to the unselected point $P_{ij}$ under the condition that the "1" states of $e_{Xi}$ and $e_{Yj}$ are not superposed on each other is $V_2 - V_3$ in the time slot of the "1" state of $e_{Xi}$, or $V_1 - V_4$ in the time slot of the "1" state of $e_{Yj}$, or $V_1 - V_3$ in the time slot of the "0" state of both $e_{Xi}$ and $e_{Yj}$.

$$\left\{\frac{1}{N}(V_2 - V_3 + V_1 - V_4) + \frac{N-2}{N}(V_1 - V_3)\right\}T$$

The effective voltage thereof is $$\sqrt{\frac{1}{N}(V_2 - V_3)^2 + (V_1 - V_4)^2 + \frac{N-2}{N}(V_1 - V_3)^2}$$

These values are constant at any unselected point. While, the DC component of the voltage applied to the selected point $P_{ij}$ where the "1" states of $e_{Xi}$ and $e_{Yj}$ are superposed on each other is $$\left\{\frac{1}{N}(V_2 - V_4) + \frac{N-1}{N}(V_1 - V_3)\right\}T$$

The effective voltage is $$\sqrt{\frac{1}{N}(V_2 - V_4)^2 + \frac{N-1}{N}(V_1 - V_3)^2}$$

These values are constant at any selected point.

Thus the DC component of the voltage $e_{Xi} - e_{Yj}$ applied to any cell $P_{ij}$ can be made zero when the values of $V_1$, $V_2$, $V_3$ and $V_4$ are determined so that the DC components of the voltages applied to be selected and unselected points become equal to each other, or $V_1 + (V_2 - V_1)/N = V_3 - (V_3 - V_4)/N$ It is apparent that even if the number of "1" states allowed for each signal voltage $e_{Xi}$ is $n$ (where$\leqq 2$ $n \leqq N$), the effective voltages applied to the individual X-Y matrix cells are constant with respect to selected and unselected points as long as the number of "1" states is the same for all the signal voltage $e_{Xi}$(where $i$ = 1,2, . . . ,M). For example, when the potentials corresponding to the "1" and "0" states of the scanning voltage $e_{Yj}$ are determined to be $V_0 + V(1 - (1/N$ and $V_0 - (\Delta V)/N$ respectively, and the potentials corresponding to the "1" and "0" states of the signal voltage $e_{Xi}$ are determined to be $V_0 + \Delta V[(1 - (1/N)]$ and $V_0 - (\Delta V)/N$ respectively, and the potentials corresponding to the "1" and "0" states of the signal voltage $e_{Xi}$ are determined to be $V_0 + \Delta V[1 - (n]/N$ and $V_0 - \Delta V (n/N)$ respectively, then the DC component of the voltage $e_{Xi} - e_{Yj}$ applied to all the cells $P_{ij}$ can be made zero and the effective voltages applied to the selected point and to the unselected point can be made constant.

Figure 7:
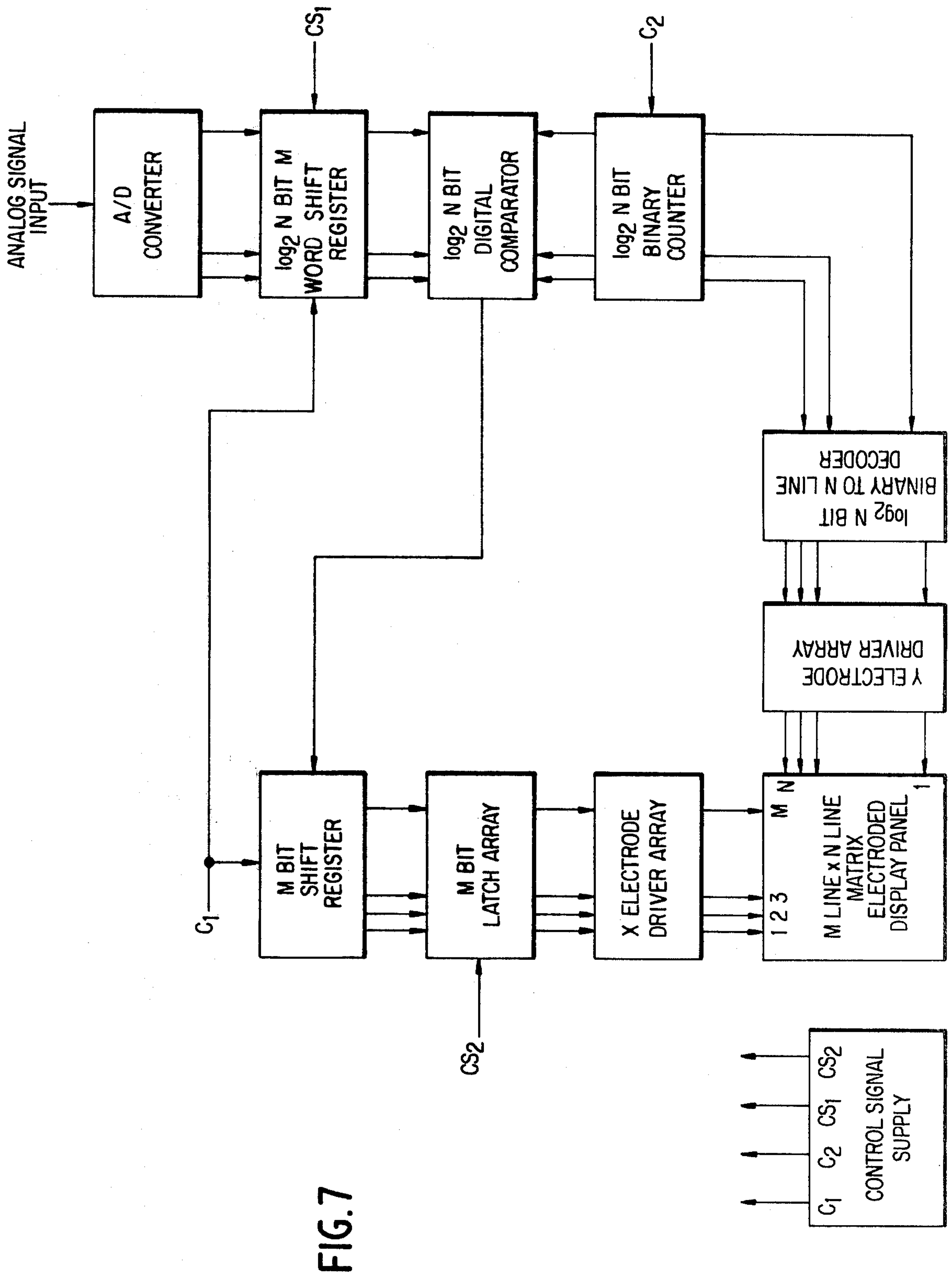
FIG. 7 is a block diagram of a main part of an electronics circuit of a memory type waveform display apparatus using a drive system according to the invention.

The present invention will now be described with reference to the block diagram of FIG. 7 showing a main part of an electronics circuit of a memory type waveform display apparatus using a drive system according to the invention.

The display apparatus has functions the same as those of the memory scope to memorize and to display variations of the times of analogue signal input. The liquid crystal elements for forming the X-Y matrix electrodes (hysteresis is not required in electrophotographic responsive characteristics to the applied voltage), or electroluminescent elements, are used as the display elements of the display apparatus.

The operation of the apparatus has two modes.

In the first mode the analogue signal input is converted to the $\log_2 N$ bit digital signal by the A/D converter and is read in M words, the $\log_2 N$ bit shift register functioning as the M step signal. In the second mode the data of the M word shift register are series-parallel converted and are applied to the X electrodes as an X electrode voltage which is synchronized to the timing for selecting the Y electrodes so as to display a desirable pattern.

A. The first mode (analogue signal input read-in mode) will now be described with reference to FIG. 7.

1. The analogue signal input is converted to the binary signal of $\log_2 N$ by the A/D converter. (N . . . number of Y electrodes).
2. The signal read-in gate in the $\log_2 N$ bit W word shift register is turned off by the control signal $CS_1$ of the control signal source and the binary signal is written in the shift register by the clock signal C.
3. After the writing of M words in $\log_2 N$ bit binary signal format (M . . . number of X electrodes) is completed, the signal read-in gate is turned on by the control signal $CS_1$.

B. The second mode (display mode) will now be described.

1. The outputs of the $\log_2 N$ bit binary counter are counted from "0" to "N−1" by the clock signal $C_2$ supplied from the control signal source (the clock signal $C_2$ generates one pulse each time M pulses are generated of the clock signal $C_1$).
2. The output of the counter is converted to a signal for providing a theoretical "1" in one of N lines and a "0" in the other lines by the $\log_2 N$ bit binary → N line decoder.
3. The output of the decoder connected to the Y electrode driver is amplified by the Y electrode driver array and is applied to the Y-electrode of the M lines X N lines matrix electrode display panel. The potential of the Y electrode is $V_2$ in the case of "1" of the theoretical input to the driver array and is $V_1$ in the case of "0".
4. On the other hand, the output (j) of the $\log_2 N$ bit binary counter is also connected to the $\log_2 N$ bit digital converter and is sequentially compared with the M data of the $\log_2 N$ bit M word shift register. When they concide, (the case of $j$), "1" is theoretically written in the M bit shift register and when they do not coincide, (the cases other than $j$), "0" is written in the M bit shift register. The signal which commands the potential of a certain X electrode (0, 1 line, plural lines or all of M lines) among M lines of X electrodes to assume the value $V_2$ in synchronization with the timing for providing the potential of a certain Y electrode $Y_j$ is written in the M bit shift register. When the writing-in in the M bit is completed, the data of the M bit shift register are at once read-in the M bit latch array by the control signal $CS_2$ supplied from the control signal source. The output of the latch array is amplified by the X electrode driver array at the same time as read-in and is supplied to the X electrodes of the display panel of M lines X N lines matrix electrodes. The potential of the electrode is $V_2$ when the data of the latch corresponds theoretically to "1" and is $V_1$ when the data of the latch array correspond to "0". The small one cycle in the display mode is completed by 1)∼4).
5. Then, the data of the $\log_2 N$ bit binary counter are counted up for one count and the next small one cycle is started.
6. Thus, one Y electrode having the potential $V_2$ (the potential of the Y electrodes at the other N − 1 lines are $V_1$) is sequentially changed whereby each of the X electrodes (M lines) are varied to be one of the two potentials $V_1$ and $V_2$. This is the potential variation of the X electrodes and the Y electrodes shown in FIG. 4 and is the case of $n = 1$ described above (the case in which all of the X electrodes are selected only once during the time of the selective scan from the first Y electrode to the Nth Y electrode, selection meaning a change of potential from $V_1$ to $V_2$).

The present invention can effectively be applied also to a multitone display device of S-level (where S>2) for operation free of undersirable influences of crosstalk upon the effective value dependent matrix cells, as in the case of a two-tone display, in whichever state. "0", "1", . . . , or "S-1" is assumed by the signal voltage in its time slot 1,2, . . . , N. For this operation, the signal pattern is to be restrained so that any of the signal voltages $e_{Xi}$ (where $i = 1,2, \ldots, M$) possesses the individual states to the same number within the repeating cycle T of the X-Y matrix (that is, at least one state exists for any signal voltage).

The X-Y matrix addressing method of this invention can readily be applied to various display devices such as, for example, a thermal printer comprising matrix cells, and a large-screen display device comprising tungsten lamps arranged in a matrix form.

According to the invention, as has been described, the display contrast can be markedly improved, and the variation in the response by matrix cells can be minimized by suitably limiting the responsive pattern. It is evident that the matrix addressing method of this invention is strongly desirable for the purpose of achieving a highest quality matrix display.

Although specific embodiments of the invention have been disclosed in detail, it is to be understood that this is for the illustration of the invention and should not be construed as necessarily limiting the scope of the invention, since it is apparent that many changes can be made to the disclosed arrangements by those skilled in the art to suit particular applications.

What is claimed as new and desired to be secured by letters patent of the United States is:

1. A matrix addressing method for a group of X-Y matrix display cells having an $X_i$-$Y_j$ two-dimensional matrix electrode structure (where $i$ equals 1,2,3, . . . , M, and $j$ equals 1,2,3, . . . , N) during an N time frame period comprising the steps of:

applying an $X_i$-electrode voltage $e_{Xi}$ having a binary value of one or zero to the 1,2,3, . . . , M electrodes in such a manner that predetermined number of binary is applied during each time frame;

applying a $Y_j$-electrode voltage $e_{Yj}$ having a binary value of one or zero sequentially to the 1,2,3, . . . , N $Y_j$ electrodes in such a manner that a binary one is only applied to the first electrode during the first time frame, a binary one is only applied to the second electrode during the second time frame, a binary one is only applied to the third electrode during the third time frame, . . . , and a binary one is only applied to the Nth electrode during the Nth time frame; and addressing matrix display cells $P_{ij}$ in response to the timing at which the electrode voltages $e_{Xi}$ and $e_{Yj}$ assume individual binary states.

2. A matrix addressing method as claimed in claim 1 further comprising the steps of setting the $Y_j$- electrode voltage $e_{Yj}$ to a constant potential $V_2$ when $e_{Yj}$ is a binary one and to a constant potential $V_1$ when $e_{Yj}$ is a binary zero and setting the $X_i$-electrode voltage $e_{Xi}$ to a constant potential $V_2$ when $e_{Xi}$ is a binary one and to a constant potential $V_1$ when $e_{Xi}$ is a binary zero.

3. A matrix addressing method as claimed in claim 1 further comprising the steps of setting, when $n=1$, the $Y_j$-electrode voltage $e_{Yj}$ to a constant potential $V_2$ when $e_{Yj}$ is a binary one and to a constant potential $V_1$ when $e_{Yj}$ is a binary zero and setting the $X_i$-electrode voltage $e_{Xi}$ to a constant potential $V_4$ when $e_{Xi}$ is a binary one and to a constant potential $V_3$ when $e_{Xi}$ is a binary zero and establishing the relationship among $V_1$, $V_2$, $V_3$ and $V_4$ as follows:

$$V_1 + (V_2 - V_1)/N = V_4 - (V_3 - V_4)/N$$

4. A matrix addressing method as claimed in claim 1 further comprising the steps of setting when $N > n \geqq 2$, the $Y_j$-electrode voltage $e_{Yj}$ to a potential $V_O + \Delta V[1 - (1 N)]$ when $e_{Yj}$ is a binary one and to a potential $V_0 + \Delta V[1 - (\Delta V/N)]$ when $e_{Yj}$ is a binary zero and setting the $X_i$— electrode voltage $e_{Xi}$ to a potential $V_0 + \Delta V([1 - (n/N)]$ when $e_{Xi}$ is a binary one and to a potential $V_0 + \Delta V(n/N)$ when $e_{Xi}$ is a binary zero.

5. A matrix addressing method as claimed in claim 1 wherein the group of matrix display cells are liquid crystal cells.

6. A matrix addressing method as claimed in claim 1 wherein the group of matrix display cells are electroluminescent cells.

7. A matrix addressing system comprising:

means for converting an analogue signal of an N level to a binary signal $l = log_2N$ with an A/D convertor and for writing M signals of each predetermined sampling interval in a $l$ -bit and M word register memory;

means for repeatedly counting up from 0 to $N-1$ with a N progress $l$ bit counter;

means for sequentially comparing the data of said $l$ bit shift register and the data of said $l$ bit counter at a word unit in parallel for M words and writing "1" when they coincide and writing "0" when they do not coincide in the M bit shift register;

means for maintaining the data in a M bit latch array after comparing and writing the data for M words;

means for applying to M of the X-electrodes a first predetermined potential in the case of "1" and a second predetermined potential in the case of "0" depending upon the data of the latch array;

means for converting the binary output of the $l$ bit counter to an N binary output with a decoder; and means for applying to N of Y-electrodes a third predetermined potential in the case of "1" and a fourth predetermined potential in the case of "0" depending upon the data of the decoder output.

8. A matrix addressing system according to claim 7 wherein said first predetermined potential is equal to said third predetermined potential and said second predetermined potential is equal to said fourth predetermined potential.

* * * * *

UNITED STATES PATENT AND TRADEMARK OFFICE

CERTIFICATE OF CORRECTION

PATENT NO. : 4,044,345

DATED : August 23, 1977

INVENTOR(S) : Ueda et al

It is certified that error appears in the above-identified patent and that said Letters Patent are hereby corrected as shown below:

Please insert the following information:

--[30] Foreign Application Priority Data

March 27, 1973 Japan ..................48-35215--

Signed and Sealed this

Fourth Day of April 1978

[SEAL]

Attest:

RUTH C. MASON
Attesting Officer

LUTRELLE F. PARKER
Acting Commissioner of Patents and Trademarks